(12) United States Patent
Moisuc et al.

(10) Patent No.: US 12,174,950 B2
(45) Date of Patent: Dec. 24, 2024

(54) METHOD FOR DETECTING REVERSE ENGINEERING ON A PROCESSOR USING AN INSTRUCTION POINTER AND CORRESPONDING INTEGRATED CIRCUIT

(71) Applicants: STMicroelectronics (Alps) SAS, Grenoble (FR); STMicroelectronics (Grenoble 2) SAS, Grenoble (FR)

(72) Inventors: Diana Moisuc, Saint Egreve (FR); Christophe Eichwald, Sassenage (FR)

(73) Assignees: STMicroelectronics (Alps) SAS, Grenoble (FR); STMicroelectronics (Grenoble 2) SAS, Grenoble (FR)

( * ) Notice: Subject to any disclaimer, the term of this patent is extended or adjusted under 35 U.S.C. 154(b) by 398 days.

(21) Appl. No.: 17/644,711

(22) Filed: Dec. 16, 2021

(65) Prior Publication Data

US 2022/0198005 A1   Jun. 23, 2022

(30) Foreign Application Priority Data

Dec. 18, 2020   (FR) ...................................... 2013623

(51) Int. Cl.
*G06F 21/55* (2013.01)
*G06F 3/06* (2006.01)
*G06F 9/30* (2018.01)

(52) U.S. Cl.
CPC .......... *G06F 21/554* (2013.01); *G06F 3/0622* (2013.01); *G06F 3/0659* (2013.01); *G06F 3/0673* (2013.01); *G06F 9/30098* (2013.01)

(58) Field of Classification Search
CPC .... G06F 21/554; G06F 3/0622; G06F 3/0659; G06F 3/0673; G06F 9/0098
See application file for complete search history.

(56) References Cited

U.S. PATENT DOCUMENTS

| | | | | |
|---|---|---|---|---|
| 6,094,716 A | * | 7/2000 | Witt | G06F 9/30032 |
| | | | | 712/E9.034 |
| 2006/0259744 A1 | * | 11/2006 | Matthes | G06F 15/7867 |
| | | | | 712/220 |
| 2012/0203977 A1 | * | 8/2012 | Shurtz | G06F 13/4243 |
| | | | | 711/E12.001 |
| 2013/0254636 A1 | * | 9/2013 | Kirkpatrick | H04L 9/0866 |
| | | | | 714/752 |
| 2015/0339480 A1 | | 11/2015 | Lutas et al. | |
| 2016/0085955 A1 | * | 3/2016 | Lerner | H04L 9/0869 |
| | | | | 726/20 |
| 2019/0166158 A1 | | 5/2019 | Grocutt et al. | |

FOREIGN PATENT DOCUMENTS

| | | | |
|---|---|---|---|
| EP | 3438865 A1 | | 2/2019 |
| WO | WO-2019025516 A1 | * | 2/2019 |

* cited by examiner

*Primary Examiner* — Techane Gergiso
(74) *Attorney, Agent, or Firm* — Slater Matsil, LLP

(57) ABSTRACT

Method for detecting the linear extraction of information in a processor using an instruction pointer. The method includes monitoring the values of the instruction pointer, determining a number of consecutive increments incrementing the values of the instruction pointer by a constant amount, and generating a detection signal if the number is greater than or equal to a detection threshold.

20 Claims, 2 Drawing Sheets

[Fig. 1]
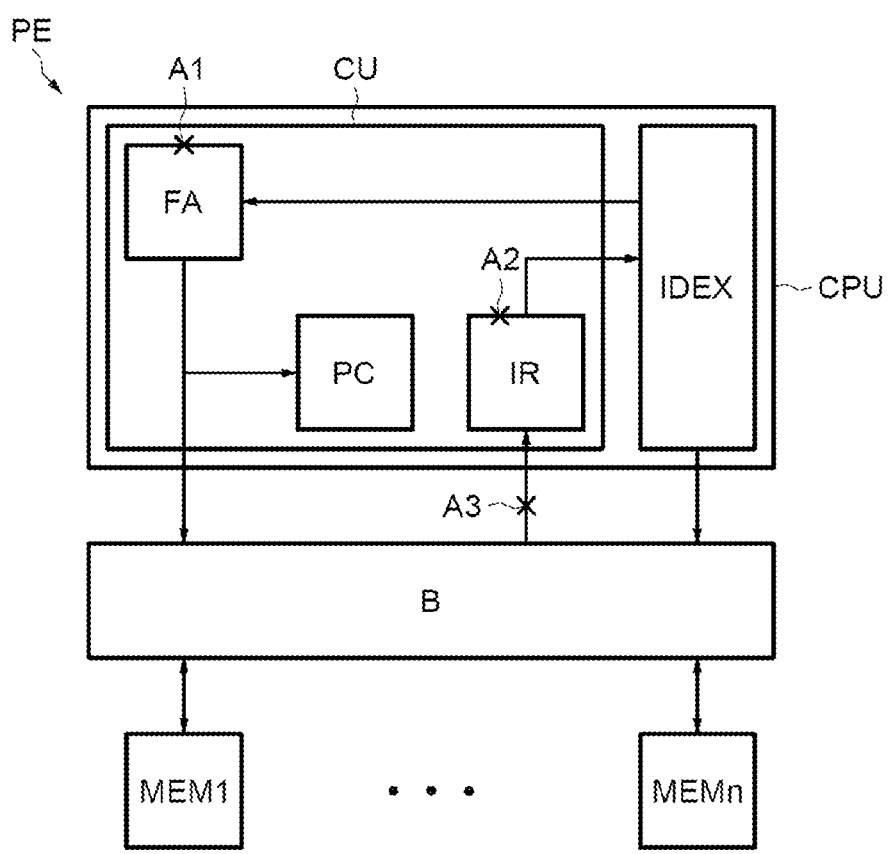

[Fig. 2]
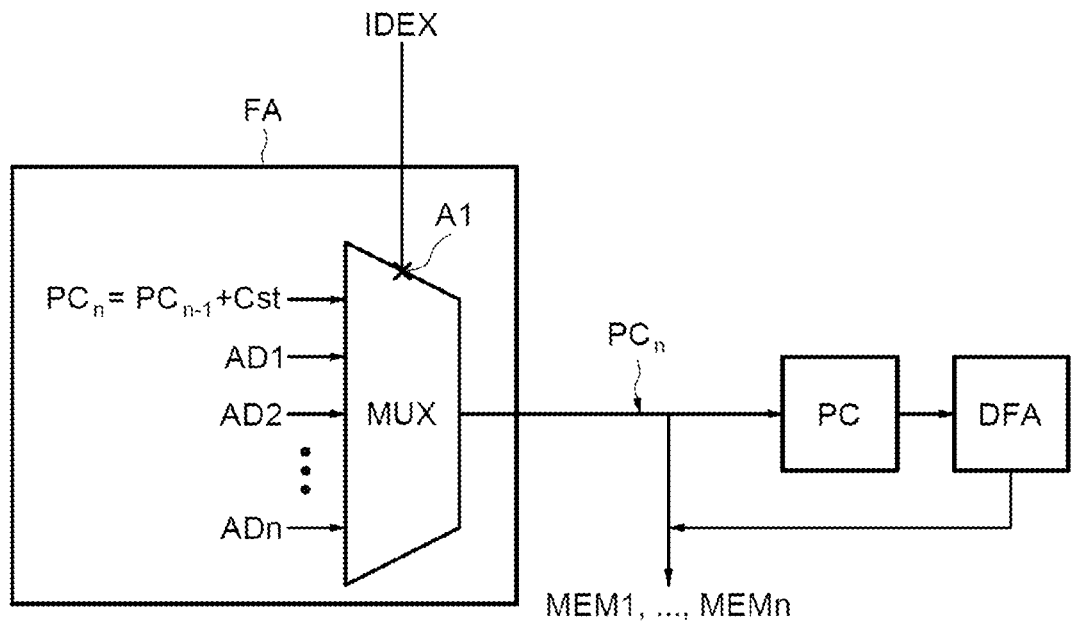
[Fig. 3]
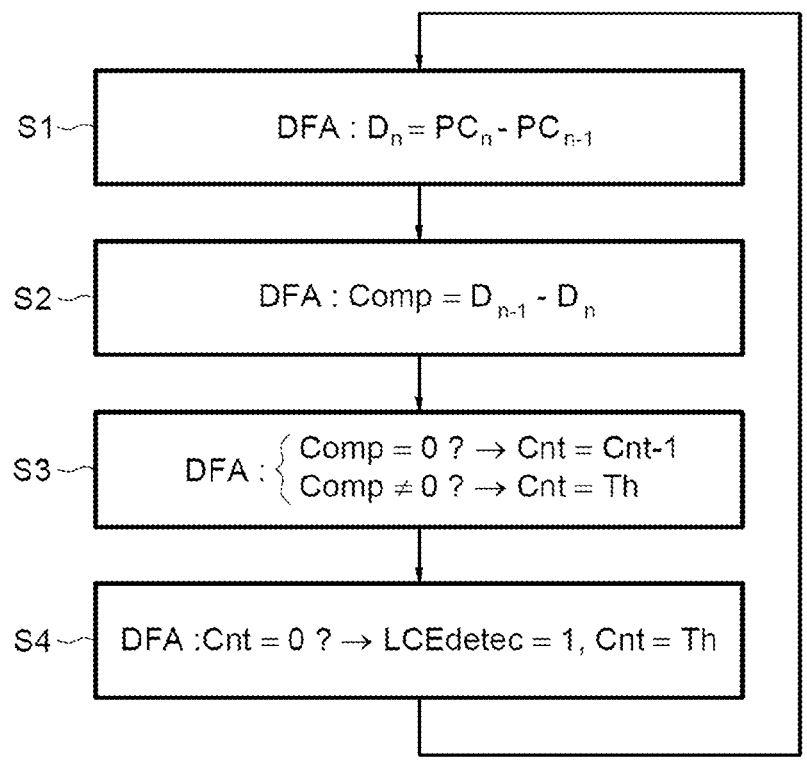

METHOD FOR DETECTING REVERSE ENGINEERING ON A PROCESSOR USING AN INSTRUCTION POINTER AND CORRESPONDING INTEGRATED CIRCUIT

CROSS-REFERENCE TO RELATED APPLICATIONS

This application claims priority to French Patent Application No. FR 2013623, filed on Dec. 18, 2020, which application is hereby incorporated by reference herein in its entirety.

TECHNICAL FIELD

The present disclosure generally relates to microelectronics and, in particular embodiments, to protections against reverse engineering.

BACKGROUND

Reverse engineering can be used to study and potentially clone a microcontroller's behavior. A microcontroller typically includes at least one processor and a memory connected via a data bus. Reverse engineering can include an invasive attack on the microcontroller to force the processor to linearly access information in the memory. In particular, the processor is forced into a linear reading mode. In such a case, software embedded in the memory is no longer correctly executed, branch instructions are no longer executed, and as a result, the processor reads all of the instructions contained in the memory sequentially (i.e., one after the other).

An example includes a hardware analysis phase, using destratification and advanced microscopy techniques to identify the hardware elements carrying secret information. The hardware analysis phase identifies the logic controlling the fetch address calculation.

A data extraction phase using focused ion beams (FIB) or fault injection techniques can be used to force the fetch address logic circuit into a linear execution mode (i.e., a mode of operation where the processor executes only branch instructions whose addressing mode includes an increment of the address currently being read in the processor).

The processor will sequentially read the entire memory content, and micro-sensor technologies extract the content read by the processor. For example, data extraction can be carried out at an instruction register, temporarily storing each instruction from memory before execution.

Based on the secret content thus extracted by reverse engineering, the software embedded in the microcontroller can be rebuilt, and cloned products can be produced.

Conventional solutions using generic hardware protection layers, or inter-operation techniques between two processors, are known and workarounds to circumvent them have been developed.

It would be advantageous to detect attempts to extract a source code contained in a memory. Moreover, it would be beneficial to respond to such attempts. Furthermore, it would be helpful to make detection and response solutions challenging to detect to complicate the development of possible workarounds.

SUMMARY

In an embodiment, the disclosure proposes a method for detecting the linear extraction of information in a processor using an instruction pointer. The method includes monitoring the values of the instruction pointer, determining the number of consecutive increments incrementing the values of the instruction pointer by a constant amount, and generating a detection signal if the number is greater than or equal to a detection threshold.

"Monitoring the values of the instruction pointer" is understood to mean, for example, systematic and routine reading of the values of the instruction pointer, which does not affect the conventional use of the instruction pointer as a memory address indicator.

"Increment" is understood to mean, for example, a change in the value of the instruction pointer corresponding to the addition of a positive integer amount (which can be equal to 1 or greater than 1) to the previous value of the instruction pointer. Thus, "consecutive increments by a constant amount" is understood to mean consecutive changes in the value of the instruction pointer, each corresponding to the addition of the same positive integer amount respectively to each previous value of the instruction pointer.

However, a linear code extraction step of a reverse engineering method produces a number of consecutive increments, incrementing the values of the instruction pointer by a constant amount that can be higher than normal (i.e., higher than the detection threshold chosen in this respect).

Thus, monitoring the values of the instruction pointer and generating the detection signal according to this aspect allow a reverse engineering method, in particular a linear code extraction step, in progress on the processor to be detected and reported.

Moreover, the value of the instruction pointer is conventionally stored in a register located inside the processor.

In an embodiment, the method can be directly integrated into the processor, which is challenging to identify in reverse engineering. This increases the complexity of the reverse engineering procedure and tends to make this type of procedure non-profitable overall.

In an embodiment, determining the number of consecutive increments by the constant amount includes comparing the amounts by which the values of the instruction pointer are consecutively incremented. The comparison of the amounts by which the values of the pointer are consecutively incremented allows determining whether the new amount is equal to or different from the previous amount. This allows a series of increments, by a constant amount, to be monitored to detect whether the instruction pointer is being incremented linearly.

In an embodiment, determining the number of consecutive increments by a constant amount includes decrementing a value of a counter, previously set to the detection threshold, if two amounts by which the values of the instruction pointer are consecutively incremented are equal, resetting the value of the counter to the detection threshold if, conversely, the two amounts by which the values of the instruction pointer are consecutively incremented are different, and the detection signal is generated when the value of the counter is zero.

Using a decrement is more robust, by design, than an increment if a register containing the detection threshold value is forced back to its start point in an attempt to work around the detection method.

More specifically, a decremented counter is set to the value of the threshold, which is a priori not known by the person carrying out reverse engineering. Conversely, an incremented counter is a priori set to a zero value.

As a result, the reverse engineering procedure will require additional work to identify the start point of the counter, which increases the complexity of implementing the procedure to make it non-profitable overall.

In an embodiment, the value of the detection threshold is chosen in conjunction with an implementation of a source code to allow the values of the instruction pointer to be consecutively incremented by a constant amount during normal execution of the source code by the processor.

Thus, the joint choice of the detection threshold and the implementation of the source code procures a good compromise between the expected level of security and the execution performance of the source code.

By jointly providing the implementation of the source code and the value of the detection threshold as a function of the source code, any generation of a detection signal during the normal operation of the processor can be prevented.

In embodiments, the source code must comply with the threshold value. If normal execution of the source code triggers a detection signal, then skip branch instructions can be introduced into the source code to interrupt the linearity thereof.

Since the choice of the detection threshold value limits the number of instructions that can be extracted during a reverse engineering procedure, the detection threshold value should advantageously be minimized, potentially by adapting the implementation of the source code in this respect.

In an embodiment, the disclosure proposes a method for protecting against the linear extraction of information includes the detection method as defined hereinabove. In response to the generation of the detection signal, the method further includes a step forcing the memory address of a next reading operation of the processor to direct to memory locations, the content of which is not confidential.

Thus, once a linear code extraction has been detected, the processor is forced to only read non-confidential content, limiting the information that the reverse engineer can exploit.

In an embodiment, the method includes resetting the pointer to values of the instruction pointer taken before the generation of the detection signal or commanding access to memory locations, the original content whereof is not confidential.

Thus, commanding access to memory locations intended to contain non-confidential original content is a simple solution for securing the processor in response to detecting a linear code extraction.

For the same purpose, the pointer can be reset to values taken by the instruction pointer before the detection signal was generated, which forces the processor to only read content in the memory that has already been read before the detection signal was generated.

More specifically, the value of the instruction pointer corresponds to the memory address being read by the processor. Memory addresses that have not been read before the detection signal was generated are thus protected.

Moreover, resetting the instruction pointer to a value pointing to an address in the memory makes the detection method challenging to identify because the processor continues to operate in a linear information extraction mode that could lead an attacker to believe that linear code extraction is still in progress.

For example, the pointer is reset in this regard to values between the first and the last value of the instruction pointer on which the number of consecutive increments incrementing by a constant amount has been determined to be greater than or equal to the detection threshold. This more specifically limits the address values read by the processor to only the instruction pointer values taken during the unauthorized increments.

In an embodiment, the disclosure proposes an integrated circuit that includes a processor having a register for containing a value of an instruction pointer, a detector circuit having a monitoring circuit configured to monitor the values of the instruction pointer, a counter circuit configured to determine the number of consecutive increments incrementing the values of the instruction pointer by a constant amount, and a generating circuit configured to generate a detection signal if the number is greater than or equal to a detection threshold.

In an embodiment, the counter circuit is configured to compare amounts by which the values of the instruction pointer are consecutively incremented.

In an embodiment, the counter circuit is configured to decrement a value of a counter, intended to be previously set to the detection threshold. If two amounts by which the values of the instruction pointer are consecutively incremented are equal, and if this is not the case, to reset the value of the counter to the detection threshold. The generating circuit is configured to generate the detection signal when the value of the counter is zero.

In an embodiment, the choice of the value of the detection threshold and implementation of a source code are jointly adapted to allow the values of the instruction pointer to be consecutively incremented by a constant amount during normal execution of the source code by the processor.

In an embodiment, the integrated circuit further includes a response circuit configured to force the memory address of a next reading operation of the processor to direct to memory locations, the content whereof is not confidential.

In an embodiment, the response circuit is configured such that it resets the pointer to values of the instruction pointer taken before the generation of the detection signal or commands access to memory locations, the original content of which is not confidential.

In an embodiment, the response circuit is configured such that it resets the instruction pointer to values included between the first and the last value of the instruction pointer on which the number of consecutive increments incrementing by a constant amount has been determined to be greater than or equal to the detection threshold.

In an embodiment, the detector circuit and the response circuit include a logic circuit located in a glue logic-type logic circuit region of the processor.

BRIEF DESCRIPTION OF THE DRAWINGS

Other advantages and features of the disclosure will become apparent upon examining the detailed description of implementations and embodiments, which are in no way limiting, and of the appended drawings wherein:

FIG. 1 is a diagram of an embodiment microcontroller;

FIG. 2 is a diagram of a fetch address circuit, the register of the instruction pointer, and a detector circuit of the microcontroller in FIG. 1; and FIG. 3 is a flow diagram of an embodiment method.

DETAILED DESCRIPTION OF ILLUSTRATIVE EMBODIMENTS

FIG. 1 illustrates a block diagram of an embodiment microcontroller (PE) during a reverse engineering attempt of the "Linear Code Extraction" (LCE) type. The microcontroller (PE) shown includes a processor (CPU) connected to at least one memory MEM1, MEMn, via a data bus (B). For the sake of simplicity, memory shall be used to designate at least one of the memories MEM1, . . . , MEMn.

The processor (CPU) includes a controller circuit (UC) and a circuit (IDEX) for decoding and executing instructions. In embodiments, the controller circuit (UC) includes a fetch address circuit (FA), an instruction pointer register (PC) containing a value of an instruction pointer, and an instruction register (IR).

During the operation of the processor (CPU), the fetch address circuit (FA) calculates an address to be read in the memory MEM1, . . . , MEMn, and the instruction pointer register (PC) of the instruction pointer stores this address.

A source code stored in the memory at the address pointed to by the instruction pointer register (PC) is loaded into the instruction register (IR). Then, the instruction register (IR) transmits the source code to the circuit (IDEX), which decodes the source code and executes a corresponding instruction.

In embodiments, the linear code extraction (LCE) attempt can include an attack on the fetch address circuit (FA). For example, the fetch address circuit (FA) is forced to increment, in a loop, the value of the instruction pointer register (PC) by a constant amount such that the addresses read by the processor (CPU) sequentially traverse the entire memory MEM1, . . . , MEMn.

In embodiments, the linear code extraction (LCE) attempt can include a first implementation (A1) using, for example, focused ion beams (FIB) on the fetch address circuit (FA) to impose electric potentials and thus change logical values.

In embodiments, the first implementation (A1) can include fault injection techniques to force the fetch address circuit (FA) into a linear incrementing mode.

In embodiments, such fault injection techniques provide for physically modifying the circuit (e.g., by adding or removing electrical connections) to take control of the fetch address circuit (FA).

Moreover, the attempt can further include the use of a second implementation (A2) and/or of a third implementation (A3) for extracting logical values. The second implementation (A2) and/or third implementation (A3) use microsensors arranged on a channel on which data flows from the memory to the processor (CPU), for example, directly on the instruction register (IR) or on the data bus (B) connecting the instruction register (IR) to the memory. It is thus conventionally possible to read the source code linearly extracted from the memory and temporarily stored in the instruction register (IR).

FIG. 2 illustrates a block diagram of an embodiment fetch address circuit (FA), the instruction pointer register (PC), and a detector circuit (DFA) for detecting a linear increment of the instruction pointer register (PC) of the microcontroller (PE), described with reference to FIG. 1.

In embodiments, the detector circuit (DFA) is configured to report an attempted linear code extraction (LCE), as described with reference to FIG. 1.

In embodiments, the first implementation (A1) of the extraction attempt includes forcing a selector of a multiplexer (MUX) contained in the fetch address circuit (FA).

In embodiments, the first implementation (A1) forces the selector of the multiplexer (MUX) to output, from the fetch address circuit (FA), an address obtained by adding a constant amount Cst to a previous value $PC_{n-1}$ of the instruction pointer register (PC). This forcing of the selector is carried out at the expense of other addresses AD1, AD2, . . . , ADn that could theoretically also be selected and produced at the output of the multiplexer (MUX) during normal operation of the microcontroller (PE).

Normal operation of the microcontroller (PE) is understood to mean the operation for which it was designed as specified, for example, in a manufacturer's user manual (commonly known as a datasheet).

Within the scope of the method for detecting the linear extraction of information, normal operation can be considered to be a situation in which the microcontroller is not being subjected to a linear code extraction attempt.

The address output from the multiplexer (MUX) of the fetch address circuit (FA) is then stored in the register of the instruction pointer register (PC).

In embodiments, to implement the detection of the linear code extraction attempt, the detector circuit (DFA) includes a monitoring circuit for reading the successive values PCn, PCn−1 stored in the register of the instruction pointer register (PC). For this purpose, the detector circuit (DFA) is connected to the register of the instruction pointer register (PC).

Moreover, the detector circuit (DFA) further includes a counter circuit configured to determine the number of consecutive increments incrementing the values PCn, PCn−1 of the instruction pointer by the constant amount Cst. To this end, the counter circuit can, for example, include a counter, the current value of which is representative of the number of consecutive increments by the constant amount Cst.

In embodiments, the linear extraction attempt is detected, for example, when the counter's value indicates a number of consecutive increments, by the constant amount Cst, that is greater than or equal to the detection threshold, and a detection signal is generated as a result.

In embodiments, the detector circuit (DFA) includes a generating circuit configured to output a detection signal if the number of increments, by the constant amount Cst, is greater than or equal to the detection threshold. The value of the detection threshold can be chosen in conjunction with a specific implementation of a source code contained in the memory.

In embodiments, the choice of the value of the detection threshold and the implementation of the source code can be determined to allow for a "normal" number of increments, by a constant amount, that can be executed consecutively without triggering the detection signal, during the execution of the source code by the processor.

For example, skip branch instructions can be introduced, during the implementation of the source code, to adapt to the chosen detection threshold, to reduce the normal number of increments, by a constant amount, caused by the execution of the source code by the processor.

The normal number of increments incrementing by a constant amount can be obtained automatically by simulating the execution of the source code by the processor (CPU) or empirically.

In embodiments, normal increments, by a constant amount, are caused by a routine execution of an incremental branch instruction contained in the source code by the processor (CPU).

An "incremental branch instruction" is understood to mean an instruction that uses an addressing mode where a next address to be read by the processor is defined relative to the address being read, typically by specifying an amount by which the address being read must be incremented. In other words, an incremental branch instruction causes the memory addresses to be read sequentially (i.e., one after the other in the ascending order of the memory addresses).

Incremental branch instructions are the opposite of skip branch instructions, which cause a skip to a memory address independent of the current address of the instruction pointer or the last address read by the processor. Skip branch instructions are, for example, instructions of the assembly language such as jump instructions, procedure call instructions, and return instructions after a procedure.

Advantageously, in the method for detecting the linear extraction of information, the execution, by the processor (CPU), of a skip branch instruction automatically causes the counter circuit to reset. More specifically, a skip branch instruction interrupts the linear reading of the memory addresses. Thus a skip branch is representative of an operation that is not forced in a linear code extraction.

Furthermore, a response is advantageously provided to the detection of the linear code extraction attempt to protect the content of the memory not yet read during the attempt.

A response circuit included, for example, in the detector circuit (DFA), is configured to reset the instruction pointer register (PC) to address values of the memory MEM1, . . . , MEMn, already read before the attempt was detected.

For example, resetting the values of the pointer can include implementing an infinite loop of values included between the first and the last values taken by the instruction pointer during the extraction attempt (i.e., the first and the last values taken by the instruction pointer register (PC) during the increments, by the constant amount Cst, that led to the generation of the detection signal).

Moreover, the detector circuit (DFA) and the response circuit can, for example, be located in a region of the processor (CPU).

In embodiments, the detection and response circuits are advantageously in a "glue logic"-type region. More specifically, techniques are known for hiding a logic circuit in such a region. Thus, one specific advantage of placing the detector circuit (DFA) among elements of a glue logic-type region is that it makes it difficult to corrupt the detector circuit (DFA).

FIG. 3 illustrates a flow diagram of an embodiment method of implementation by the detector circuit (DFA) described with reference to FIG. 2. Step S1 includes monitoring the consecutive values PCn, PCn−1 of the instruction pointer register (PC), when each new value is stored in the register of the instruction pointer register (PC). In embodiments, step S1 includes, when each new value is stored, calculating the incremented amount Dn corresponding to the difference between the consecutive values PCn, PCn−1 of the instruction pointer register (PC).

Step S2 includes producing a comparison Comp between the consecutively incremented amounts Dn, Dn−1 by which the values of the instruction pointer register (PC) are incremented, to determine, at each increment, whether the two consecutively incremented amounts Dn, Dn−1 are equal or different. The comparison Comp is used to determine whether the successively incremented amounts are part of a series of increments by the constant amount.

Step S3 includes two different actions depending on the result of the comparison Comp of the previous step S2. On the one hand, if the two consecutively incremented amounts Dn, Dn−1 are equal, then step S3 includes decrementing a value of a counter Cnt, previously set to the detection threshold Th.

Alternatively, the counter Cnt can be incremented up to the value of the detection threshold Th, in which case the value of the counter Cnt is previously set to zero.

On the other hand, if, conversely, the two consecutively incremented amounts Dn, Dn−1 by which the values PCn, PCn−1 of the instruction pointer incremented are different, then step S3 includes resetting the value of the counter to the detection threshold Th.

Step S4 includes reading the value of the counter Cnt. If the value of the counter Cnt is included between zero and the detection threshold Th, then the method returns to step S1 and waits for a new value of the instruction pointer register (PC) to be stored in the corresponding register. If the value of the counter Cnt is equal to zero, in the event that the counter is decremented, then step S4 includes generating the detection signal LCEdetec wherein a value of the detection signal LCEdetec changes from, for example, the logical value 0 to the logical value 1.

Alternatively, if the value of the counter Cnt is equal to the detection threshold Th, in the event that the counter is incremented, then step S4 includes generating the detection signal LCEdetec wherein a value of the detection signal LCEdetec changes from, for example, the logical value 0 to the logical value 1.

In both cases, when the detection signal LCEdetec is generated, the counter Cnt is reset.

Alternatively, the counting down (or counting up) of the counter Cnt can be carried out within a range of values included between two bounds arbitrarily offset from the zero point.

In embodiments, a non-zero offset value can advantageously be chosen to offset the two bounds of the counter Cnt, which ensures that neither the start point nor the endpoint of the counter Cnt can be known in advance.

In embodiments, the upper bound of the range can be chosen such that it is equal to the detection threshold plus an offset value, and the lower bound of the range can be chosen such that it is equal to the offset value. In this embodiment, the counter is decremented from the upper bound to the lower bound, or incremented from the lower bound to the upper bound.

Moreover, in this alternative embodiment, the detection signal LCEdetec could also be generated if the value of the counter Cnt is not included between the lower bound and the upper bound, which can be used to oppose an attempt to force the values of the counter Cnt beyond the two bounds. This again creates additional work that must be performed by a reverse engineering procedure and increases the complexity of the procedure, with the aim of making it non-profitable overall.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
monitoring values of an instruction pointer register;
determining a number of increments of the values of the instruction pointer register, the increments corresponding to a constant and a consecutive increment in a value of the instruction pointer register, wherein determining the number of increments comprises:
comparing a value by which the instruction pointer register is incremented in a sequence,
determining that respective values by which the instruction pointer register is incremented in the sequence are equal in value, and, based thereon, decrementing a counter value, the counter value initially set to a value of a threshold, and
determining that the respective values by which the instruction pointer register is incremented in the sequence are different in value, and, based thereon, resetting the counter value to the value of the threshold;
generating a detection signal in response to determining that the counter value is at zero; and
detecting a reverse engineering attack corresponding to a linear code extraction type of a processor comprising the instruction pointer register in response to the generating of the detection signal.

2. The method of claim 1, wherein a value of the threshold is selected in conjunction with an implementation of a source code such that the values of the instruction pointer register are incremented constantly and consecutively during a normal execution of the source code by the processor.

3. The method of claim 1, further comprising forcing a memory address of a next reading operation of the processor to be directed to memory locations having non-confidential content in response to the generating of the detection signal.

4. The method of claim 3, further comprising resetting the values of the instruction pointer register to a value of the instruction pointer register before the generating of the detection signal or commanding access to memory locations having the non-confidential content.

5. The method of claim 4, wherein the instruction pointer register is reset to values between a first value and a last value of the instruction pointer register in response to determining that the number of increments is greater than or equal to the threshold.

6. The method of claim 1, wherein monitoring values of the instruction pointer register corresponds to monitoring sequential or consecutive instructions.

7. An integrated circuit comprising a processor, the processor comprising:
an instruction pointer register configured to store pointer values;
a detector circuit configured to monitor values of the instruction pointer register;
a counter circuit configured to:
determine a number of increments of the values of the instruction pointer register, the increments corresponding to a constant and a consecutive increment in a value of the instruction pointer register,
compare a value by which the instruction point register is incremented in a sequence,
determine that respective values by which the instruction point register is incremented in the sequence are equal in value, and, based thereon, decrementing a counter value, the counter value initially set to a value of a threshold, and
determine that the respective values by which the instruction point register is incremented in the sequence are different in value, and, based thereon, resetting the counter value to the value of the threshold; and
a generator circuit configured to generate a detection signal in response to determining that the counter value is at zero, wherein the processor is configured to detect a reverse engineering attack corresponding to a linear code extraction type of the processor in response to the generating of the detection signal.

8. The integrated circuit of claim 7, wherein a value of the threshold is selected in conjunction with an implementation of a source code such that the values of the instruction pointer register are incremented constantly and consecutively during a normal execution of the source code by the processor.

9. The integrated circuit of claim 7, wherein the processor further comprises a response circuit configured to force a memory address of a next reading operation of the processor to be directed to memory locations having non-confidential content in response to the generating of the detection signal.

10. The integrated circuit of claim 9, wherein the response circuit is configured to reset the values of the instruction pointer register to a value of the instruction pointer register before the generating of the detection signal or commanding access to memory locations having the non-confidential content.

11. The integrated circuit of claim 10, wherein the response circuit is configured to reset to values between a first value and a last value of the instruction pointer register in response to determining that the number of increments is greater than or equal to the threshold.

12. The integrated circuit of claim 11, wherein the detector circuit and the response circuit comprise a logic circuit located in a glue logic type logic circuit region of the processor.

13. The integrated circuit of claim 7, wherein monitoring values of the instruction pointer register corresponds to monitoring sequential or consecutive instructions.

14. A processor, comprising:
an instruction pointer register configured to store pointer values;
a detector circuit configured to monitor values of the instruction pointer register;
a counter circuit configured to:
determine a number of increments of the values of the instruction pointer register, the increments corresponding to a constant and a consecutive increment in a value of the instruction pointer register,
compare a value by which the instruction point register is incremented in a sequence,
determine that respective values by which the instruction point register is incremented in the sequence are equal in value, and, based thereon, decrementing a counter value, the counter value initially set to a value of a threshold, and
determine that the respective values by which the instruction point register is incremented in the sequence are different in value, and, based thereon, resetting the counter value to the value of the threshold; and
a generator circuit configured to generate a detection signal in response to determining that the counter value is at zero, wherein the processor is configured to detect a reverse engineering attack corresponding to a linear code extraction type of the processor in response to the generating of the detection signal.

15. The processor of claim 14, wherein a value of the threshold is selected in conjunction with an implementation of a source code such that the values of the instruction pointer register are incremented constantly and consecutively during a normal execution of the source code by the processor.

16. The processor of claim 14, further comprising a response circuit configured to force a memory address of a next reading operation of the processor to be directed to memory locations having non-confidential content in response to the generating of the detection signal.

17. The processor of claim 16, wherein the response circuit is configured to reset the values of the instruction pointer register to a value of the instruction pointer register before the generating of the detection signal or commanding access to memory locations having the non-confidential content.

18. The processor of claim 17, wherein the response circuit is configured to reset to values between a first value and a last value of the instruction pointer register in response to determining that the number of increments is greater than or equal to the threshold.

19. The processor of claim 16, wherein the detector circuit and the response circuit comprise a logic circuit located in a glue logic type logic circuit region of the processor.

20. The processor of claim 14, wherein monitoring values of the instruction pointer register corresponds to monitoring sequential or consecutive instructions.

* * * * *